(12) United States Patent
SanGiovanni et al.

(10) Patent No.: US 9,997,138 B2
(45) Date of Patent: Jun. 12, 2018

(54) SYSTEM AND METHOD FOR ADAPTIVE AND PERSISTENT MEDIA PRESENTATIONS

(71) Applicant: Zumobi, Inc., Seattle, WA (US)

(72) Inventors: John SanGiovanni, Seattle, WA (US); Shannon Carter, Seattle, WA (US); Christina Elsberry, Sammamish, WA (US)

(73) Assignee: Zumobi, Inc., Seattle, WA (US)

( * ) Notice: Subject to any disclaimer, the term of this patent is extended or adjusted under 35 U.S.C. 154(b) by 0 days. days.

(21) Appl. No.: 15/332,953

(22) Filed: Oct. 24, 2016

(65) Prior Publication Data

US 2017/0040000 A1    Feb. 9, 2017

Related U.S. Application Data

(63) Continuation of application No. 13/462,680, filed on May 2, 2012, now Pat. No. 9,484,002.

(51) Int. Cl.
| | |
|---|---|
| *G06F 17/00* | (2006.01) |
| *G09G 5/14* | (2006.01) |
| *G06Q 30/02* | (2012.01) |
| *G06F 3/0482* | (2013.01) |
| *G06T 3/40* | (2006.01) |

(52) U.S. Cl.
CPC ............. *G09G 5/14* (2013.01); *G06F 3/0482* (2013.01); *G06Q 30/0241* (2013.01); *G06Q 30/0267* (2013.01); *G06Q 30/0277* (2013.01); *G06T 3/40* (2013.01); *G09G 2340/0442* (2013.01); *G09G 2370/027* (2013.01)

(58) Field of Classification Search
None
See application file for complete search history.

(56) References Cited

U.S. PATENT DOCUMENTS

| | | | |
|---|---|---|---|
| 8,255,491 B1 * | 8/2012 | Arzur | G06F 17/30867 709/203 |
| 2007/0255616 A1 * | 11/2007 | Gjerstad | G06Q 30/02 705/14.47 |
| 2008/0275785 A1 * | 11/2008 | Altberg | G06Q 30/02 705/14.54 |

(Continued)

OTHER PUBLICATIONS

Bob Bringhurst, "Design Decisions for Digital Publishing Apps", 2/1/201, blogs.adobe.com, URL: http://blogs.adobe.com/indesigndocs/2011/02/design-decisions-for-digital-publishing-apps.html.*

(Continued)

*Primary Examiner* — David H Chu
(74) *Attorney, Agent, or Firm* — Norton Rose Fulbright US LLP (57) ABSTRACT

Systems and methods providing for an advertisement (media) is designed using segments that can be added or subtracted are provided. By adapting the various segments of an advertisement to fit the orientation of the displaying device, and to be persistent on the display without overlaying the application being viewed by the user, it is possible to increase viewing time of the displayed media. In one embodiment, the various segments are sized to be displayed in areas (such as preview areas) of the display that the user does not typically use for his/her main work. In this manner, the displayed media is adapted for display area and does not intrude on the viewing area.

24 Claims, 6 Drawing Sheets

(56) References Cited

U.S. PATENT DOCUMENTS

| | | | | |
|---|---|---|---|---|
| 2008/0306824 A1* | 12/2008 | Parkinson | ............... | G06Q 30/02 |
| | | | | 705/14.73 |
| 2011/0134143 A1* | 6/2011 | Ko | ........................... | G09G 5/00 |
| | | | | 345/659 |
| 2011/0164057 A1* | 7/2011 | Prabhu | .................... | G06F 3/017 |
| | | | | 345/650 |
| 2012/0030033 A1* | 2/2012 | Damera-Venkata | | G06Q 30/0275 |
| | | | | 705/14.71 |
| 2013/0019150 A1* | 1/2013 | Zarom | ............. | H04N 21/25891 |
| | | | | 715/204 |
| 2013/0187861 A1* | 7/2013 | Lavallee | ................. | G06F 9/543 |
| | | | | 345/173 |

OTHER PUBLICATIONS

Cone Trees, "Transforming the Magazine Experience with WIRED" Adobe TV, Oct. 2, 2010, URL: http://www.conetrees.com/2010/02/quickposts/adobe-on-transforming-the-magazine-experience-with-wired/.*

Smashing Editorial, "Responsive Web Design: What It Is and How to Use It", Jan. 12, 2011, URL: https://www.smashingmagazine.com/2011/01/guidelines-for-responsive-web-design/.*

Simple Layout Demo, Mar. 9, 2009, URL: http://web.archive.org/web/20090309105146/http://layout.jquery-dev.net/demos/simple.html.*

Aviad, "Customizing a Popup's Auto-Close Behavior," Nov. 23, 2009, http://www.codeproject.com/Articles/44534/Customizing-a-Popup-s-Auto-Close-Behavior.

Bringhurst, B., "Design Decisions for Digital Publishing Apps," Feb. 1, 2011, blogs.adobe.com, http://blogs.adobe.com/indesigndocs/2011/02/design-decisions-for-digital-publishing-apps.html.

Food Sense, Aug. 25, 2011, URL: web.archive.org/web/20110825143854/http://foodsense.is/.

Johnson, "Auto Popup Window," Jan. 3, 2011, URL: http://www.javascriptsource.com/text-effects/auto-popup-window.html.

Moore, "Delayed Popup," Sep. 9, 2000, URL: http://www.javascriptsource.com/navigation/delayed-popup.html.

Walter, "Responsive Web Design: Layouts and Media Queries," Apr. 23, 2012, URL: http://www.onextrapixel.com/2012/04/23/responsive-web-design-layouts-and-media-queries/.

XD Inspire, "Transforming the Magazine Experience with WIRED," Adobe TV, http://tv.adobe.com/watch/xd-inspire/transforming-the-magazine-experience-with-wired/.

* cited by examiner

SYSTEM AND METHOD FOR ADAPTIVE AND PERSISTENT MEDIA PRESENTATIONS

CROSS-REFERENCE TO RELATED APPLICATIONS

This application is a continuation of U.S. patent application Ser. No. 13/462,680, filed May 2, 2012 and entitled "SYSTEM AND METHOD FOR ADAPTIVE AND PERSISTENT MEDIA PRESENTATIONS," and is also related to commonly assigned, co-pending U.S. patent application Ser. No. 13/353,676, filed Jan. 19, 2012 and entitled "SYSTEM AND METHOD FOR USER GENERATED CONTENT IN MEDIA ADVERTISEMENTS," the disclosures of which are incorporated herein by reference in their entirety.

TECHNICAL FIELD

This disclosure relates to display advertising in general and more specifically to media presentations that adapt to the environment and are persistent over a period of time.

BACKGROUND OF THE INVENTION

On computers, it has now become commonplace for advertisements (often called banner or pop-up ads) to appear (usually uninvited) on user's screens from time to time. These advertisements sometimes include video and are intended to promote products and services relevant to the user. With the introduction of smart phones, tablets and pads, the challenge to provide timely, meaningful and effective advertising has become more difficult.

One problem is that there is a large size difference between devices. Pop-up advertising must be designed to display properly on the relatively small screen of a cell phone as well as on the much larger display of an iPad. Compounding the problem is that at any given moment the user's display can be in either landscape or portrait mode. On a relatively square display space the orientation of the device is not a concern. This is not so on large rectangular displays.

Another problem is that the advertisement itself often overlaps the viewing area the user is focused on. In such a situation, it is imperative that the pop-up ad disappear from view relatively quickly to avoid alienating the user. Removing the ad faster than the user can absorb its contents makes no sense. However, allowing the ad to obscure what the user is primarily interested in is counterproductive.

BRIEF SUMMARY

In one embodiment, an advertisement (media) is designed using segments that can be added or subtracted as desired. By adapting the various segments of an advertisement to fit the orientation of the displaying device, and to be persistent on the display without overlaying the application being viewed by the user, it is possible to increase viewing time of the displayed media. In one embodiment, the various segments are sized to be displayed in areas (such as preview areas) of the display that the user does not typically use for his/her main work. In this manner, the displayed media is adapted for display area and does not intrude on the viewing area.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
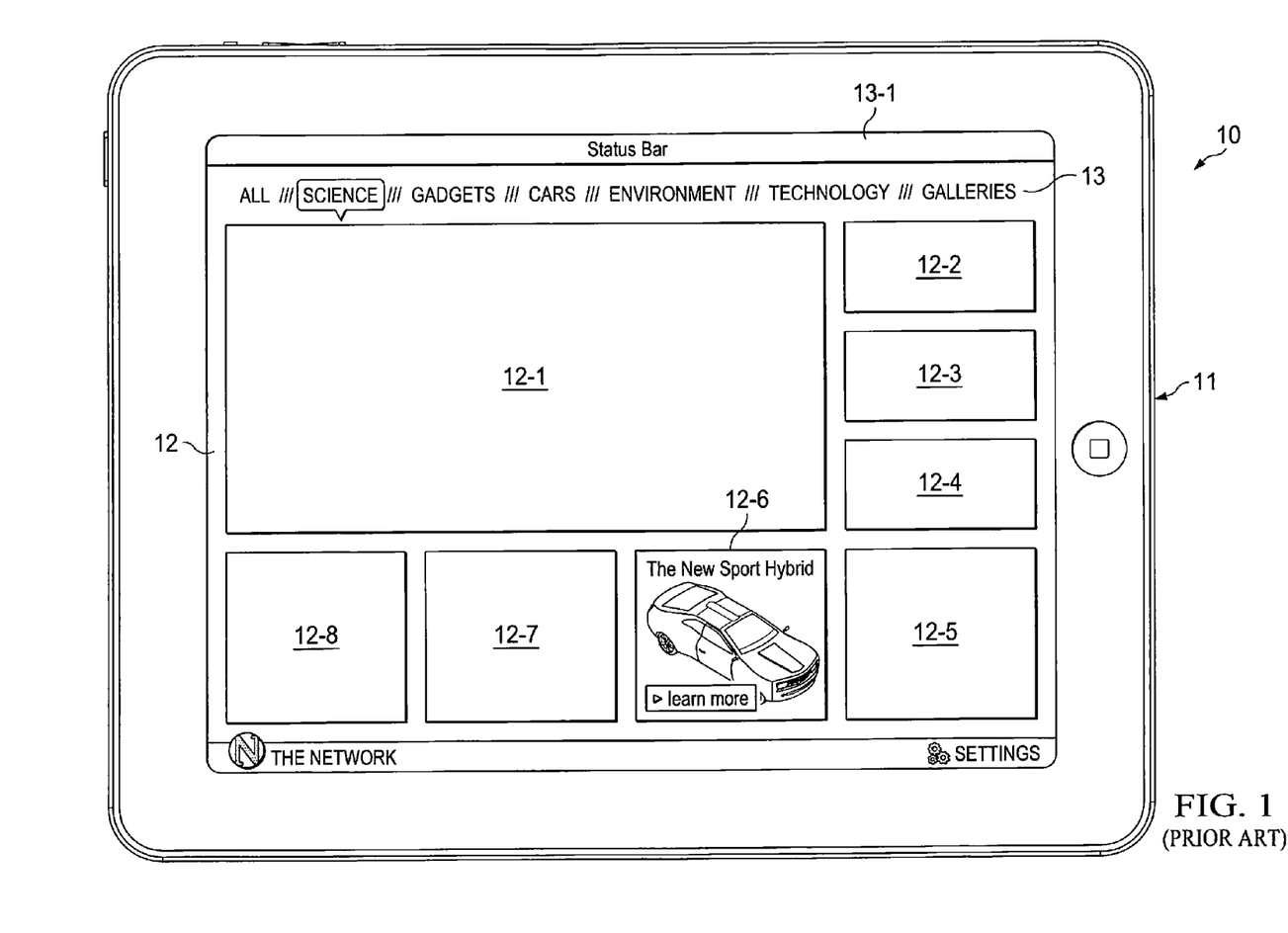
FIG. 1 shows one of many prior art devices upon which the concepts discussed herein can be displayed.

FIG. 1 shows one of many prior art devices, such as device 10, upon which the concepts discussed herein can be displayed. Device 10, can, for example, be an iPad having case structure 11 and display area 12. Contained within structure 11 is, for example, a CPU, memory and send/receive electronics. These devices, as well as their operation, are all well known to those of skill in the art and thus will not be further described herein. As above noted, the device, as well as the display area, can have a wide degree of difference as between models and brands. Also, as above noted, mechanisms on many such devices sense the orientation (usually horizontal or vertical) of the device and change the size and shape (for example, portrait to landscape) of the displayed media accordingly. Again, the manner of affecting such changed media presentations is well known.

As shown in FIG. 1, display area 12 is broken into a number of segments 12-1 to 12-8. The segments shown herein are for purposes of discussion only. Any number and arrangement of segments is possible, and such segments are dependent upon, among other factors, the application the user is accessing at any point in time. In some situations, some of the display areas are reserved for certain material, such as time, date, carrier, radio signal strength, etc. One such reserved area is shown by banner 13 and another by status bar 13-1. As is well known, there can be multiple banner areas on a device display with each having different sizes and functions. These banners can come and go from time to time, as desired by the user and/or by the application designer. The creation and positional control of such segments is performed partially by applications native to the device operating in conjunction with applications (software code) downloaded from time to time from a third party in further conjunction with input from the device user and/or other sources.

Figure 2:
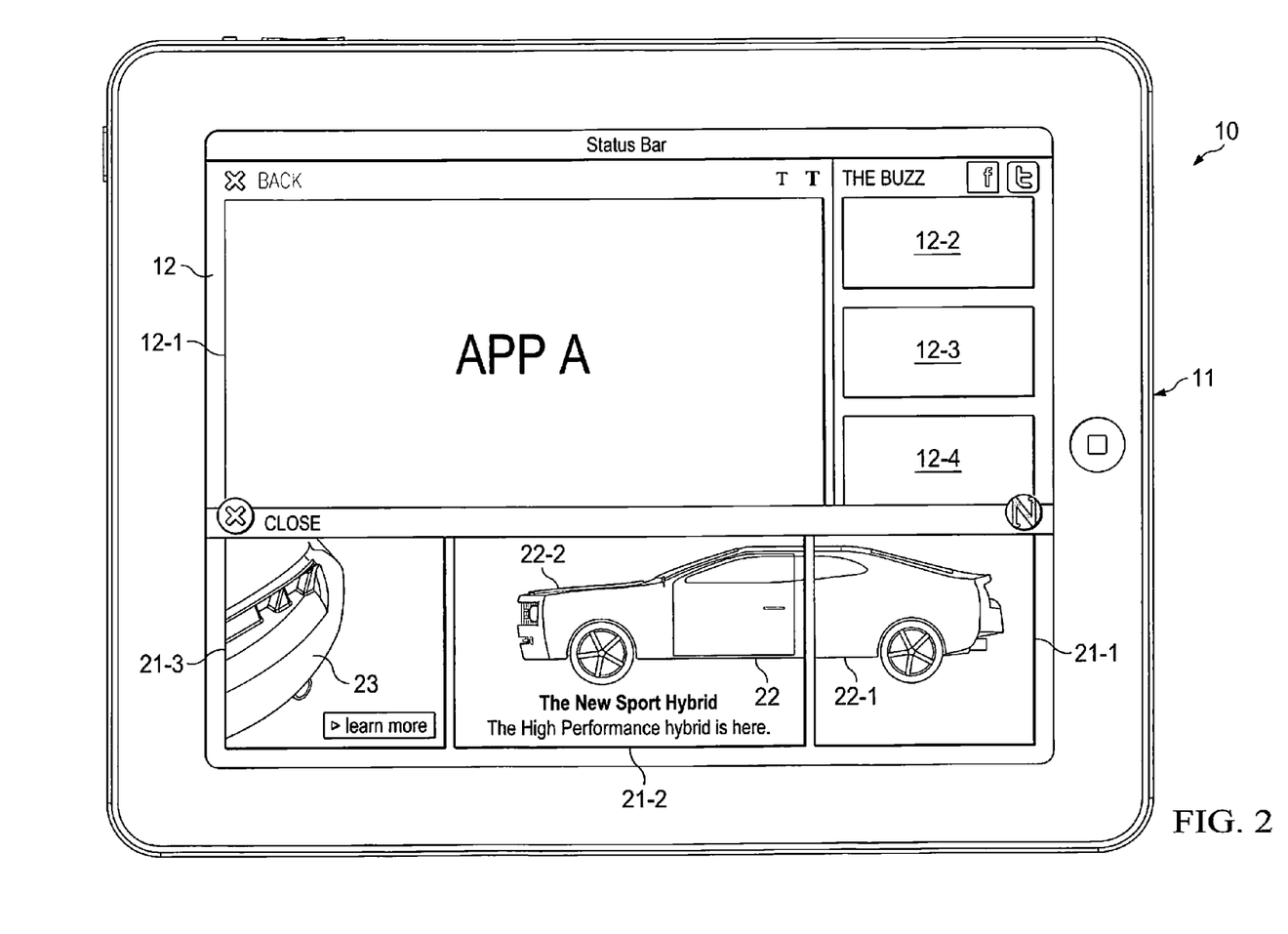
FIG. 2 shows a simulated screen shot illustrating different embodiments of the invention used in conjunction with the device of FIG. 1.

FIGS. 2 through 5 show simulated screen shots illustrating different embodiments of the invention used in conjunction with the device of FIG. 1. FIG. 2 shows an application (APP A) displayed on screen portion 12-1. This display can be of any nature and from any source. Shown beside APP A are three sections 12-2, 12-3 and 12-4 that can display any material desired, or can be dedicated to display area 12-1 if desired.

Below (in this embodiment) APP A there are shown three portions 21-1, 21-2 and 21-3 of a banner advertisement. These portions are shown with heavy lines outlining them but the lines are only shown to define the areas for the reader and in actuality there need be no lines demarcating the portions. Portions 21-1 and 22-2 display a common image (such as image 22) across the boundary between the portion such that image portion 22-1 is positioned in portion 21-1 while image portion 22-2 is positioned in portion 21-2. Screen portion 21-3 contains image 23 which is related to image 22, but not necessarily part of the common image. It is noted that image 22 may be a still image, video, or any other media that is suitable for implementing the underlying content. In one embodiment, the contents in portion 21-3 may include an image that is configured to remain on the screen upon the advertisement being closed by a user, closed after a pre-determined amount of time, or closed due to a orientation change of display area 12. In such a circumstance the user may select the close button or it may automatically close which will cause segments 21-1, 21-2 and 21-3 to slide, e.g. to the right of display area 12 such that segments 21-1 and 21-2 are off of the display area leaving display area 21-3. Some embodiments may configure this transition to be instantaneous, while others may animate this transition for aesthetic purposes. Further, upon selecting display area 21-3, embodiments may re-expand the advertisement banner or may otherwise be directed to an end destination. It is noted that while the illustrated embodiment utilizes three segments and transitions to one segment, any number of segments may be utilized in embodiments in accordance with the inventive principles outlined herein, e.g. embodiments may utilize four segments that transition down to one-three segments, etc.

Figure 3:
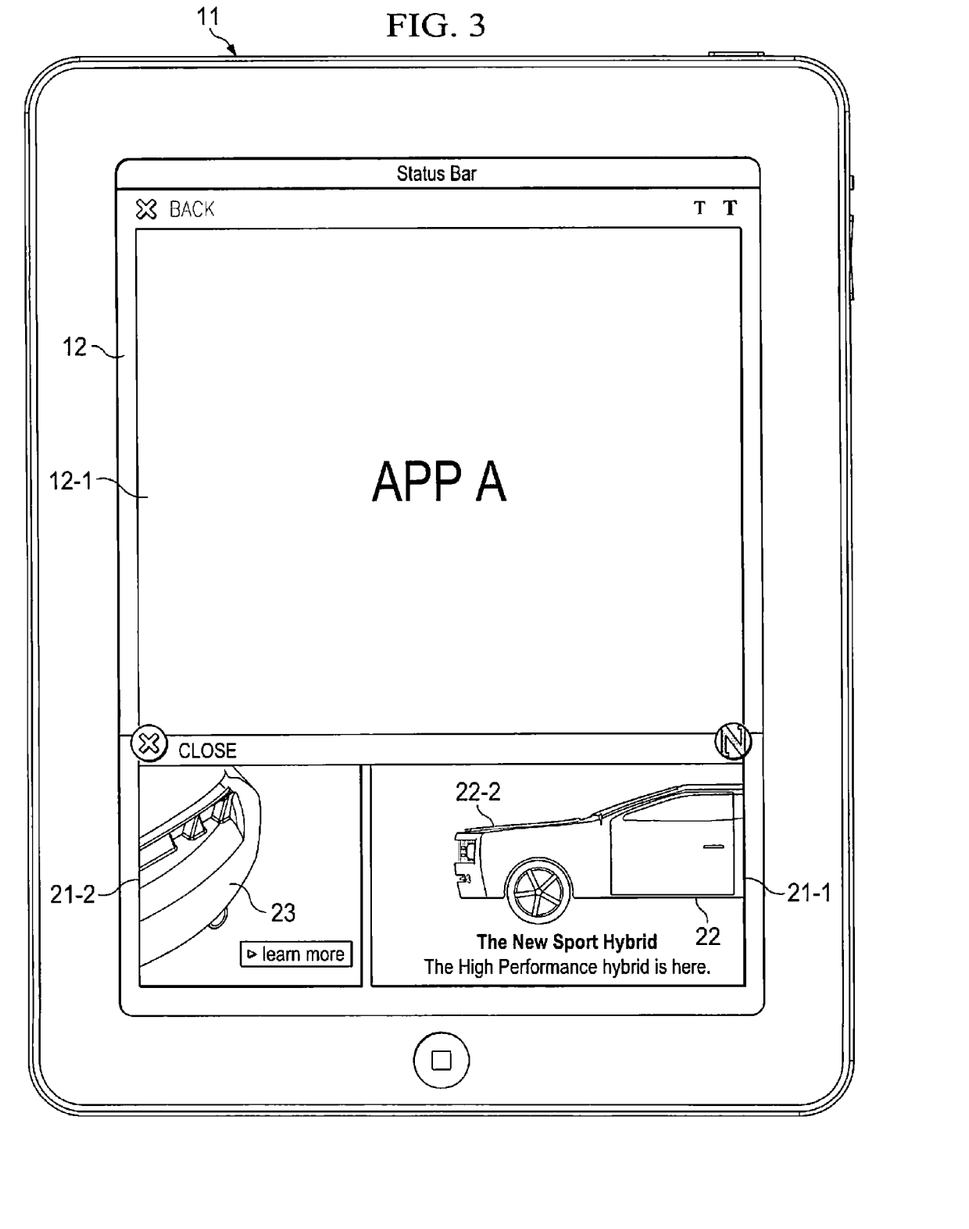
FIG. 3 shows a simulated screen shot illustrating different embodiments of the invention used in conjunction with the device of FIG. 1.

FIG. 3 shows the appearance of the display if the screen size is changed, for example, by rotating the device, or when a device is used having a different landscape. Note that when the landscape is narrowed so also is the display space for the banner advertisement. As shown in FIG. 3 portion 21-3 has been removed thereby accommodating both portions of image 22. Using this approach, it is possible to maintain the advertisement in a persistent manner for a continuous period of time, thereby giving the user more time to absorb the message. Additionally, it is noted that using the approach of this embodiment, segments may be taken from the display thereby minimizing or eliminating the need to re-scale a given segment when the orientation of the device is changed.

It is noted that in this embodiment the segment displaying an image on the right of image 22-2 was removed, however, any image of segment may be selected depending on the desired application.

Figure 4:
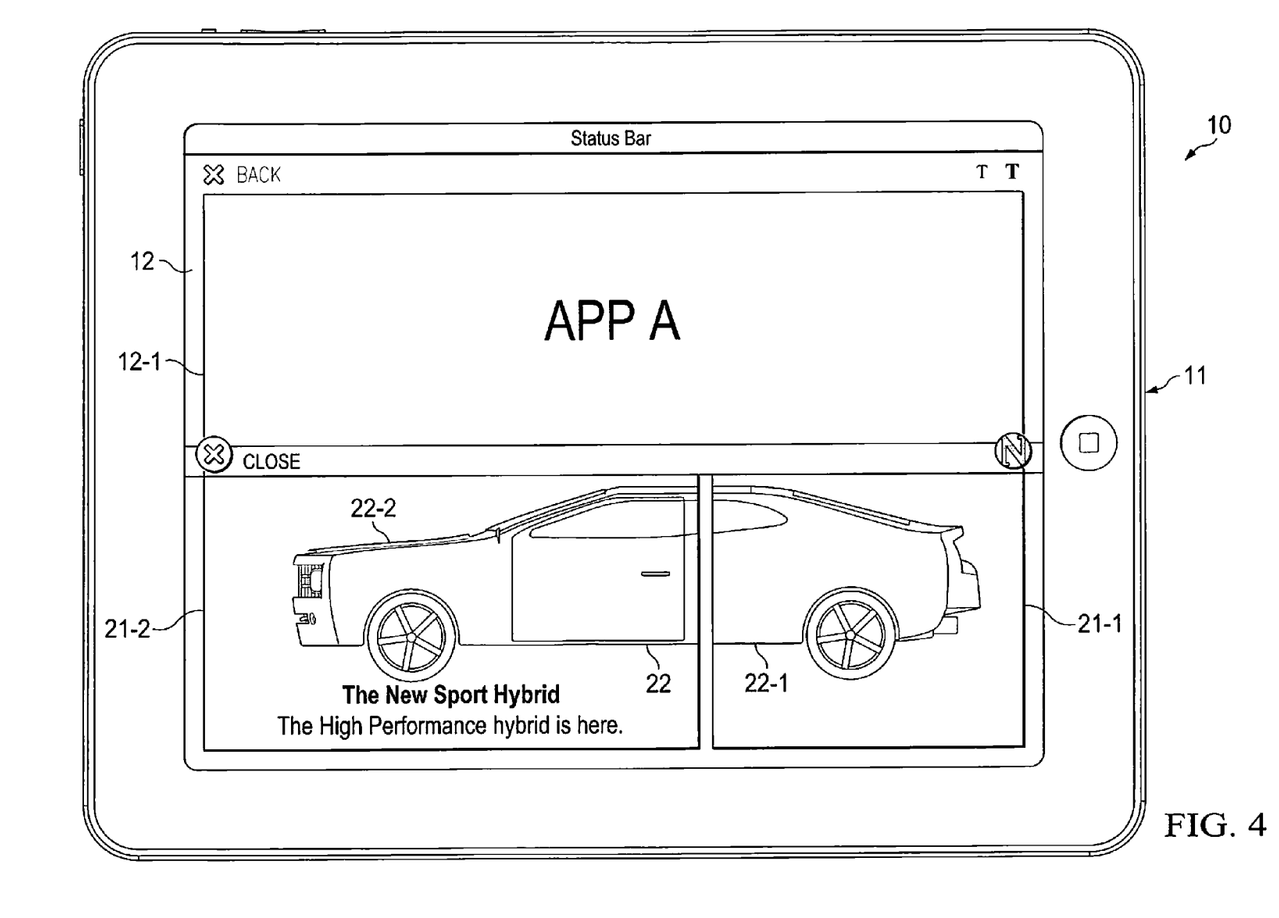
FIG. 4 shows a simulated screen shot illustrating different embodiments of the invention used in conjunction with the device of FIG. 1.

FIG. 4 shows an alternative in which portion 22-2 of image 22 is preserved as well as image 23 of portion 21-3, although image 23 is not shown. Because image 23 is preserved, embodiments may allow for dynamic alteration of the advertisement. For example, upon a horizontal/vertical orientation change, or upon closing the banner advertisement, images that are maintained but not displayed may be utilized. This demonstrates the versatility of displaying images as small screen portions so that they can be tailored to a given situation by software local to the device. This then allows the ad designer to create one image set and to allow the local device to display the image set in the best arrangement depending upon factors such as size of other images and orientation of the device. Under some situations, the number and orientation of the various portions can be dependent upon external factors, such as who the user is, or how long the display has been activated or how long a particular ad has been shown.

Figure 5:
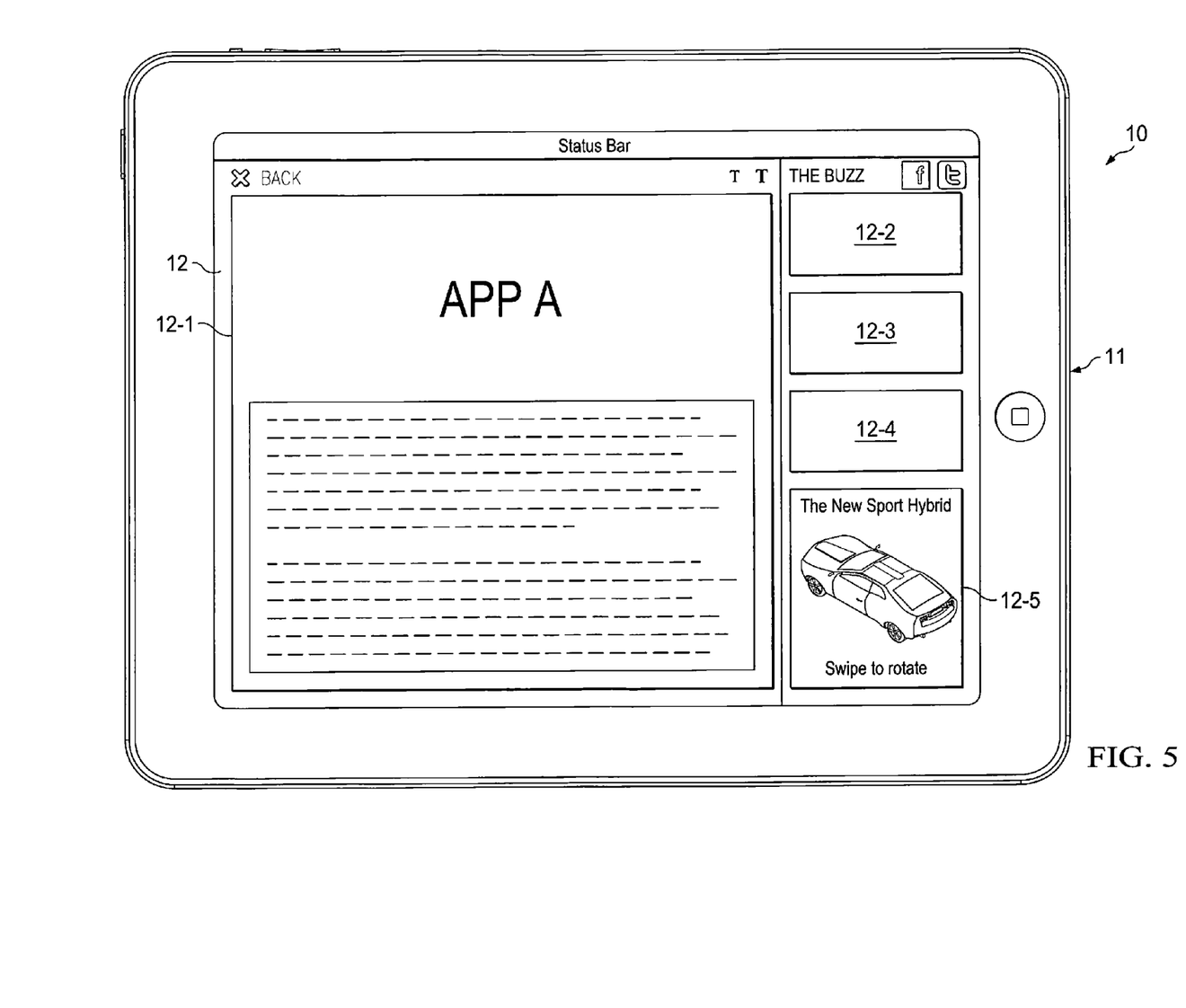
FIG. 5 shows a simulated screen shot illustrating different embodiments of the invention used in conjunction with the device of FIG. 1.

FIG. 5 shows the full add being displayed in a single portion 12-5 off to the side. This single portion may correspond to any one of the previously discussed segments, e.g. segment 21-1, 21-2 and 21-3, and may be set off to the side of display area 12 upon the banner advertisement being closed. Upon selection of single portion 12-5, one or more hidden segments may be reproduced onto display area 12, or such a selection may function to direct the user to a different application, website, etc.

Figure 6:
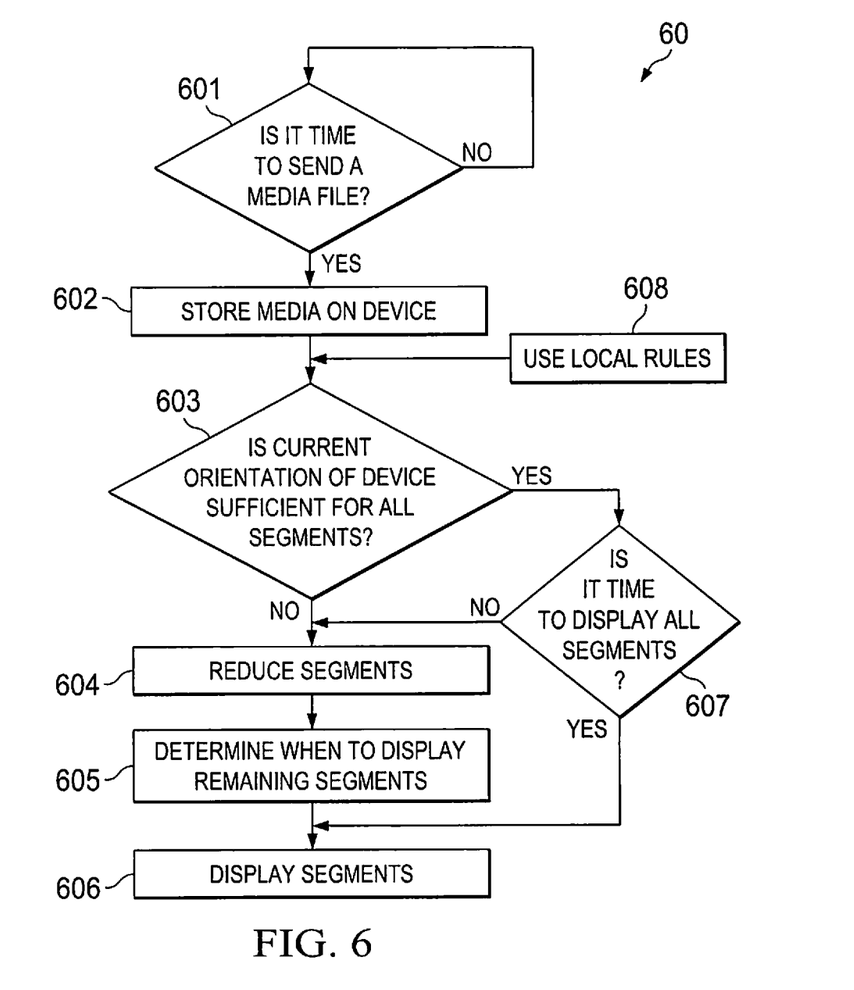
FIG. 6 shows one embodiment of a method of operation of the concepts discussed herein.

FIG. 6 shows one embodiment of a method 60 of operation of the concepts discussed herein. Method 60, in one embodiment, runs on code residing on the device and controlled by the device processor (not shown). Process 601 determines if it is time to send a media file to a particular user. The timing can be upon request of the user, or it can be statistically based, or it can be controlled by other factors external to the user at said particular device. One such external factor can be products or services the user has visited on other websites. In any event, when the media is ready to be sent it is processed at a server (or other distribution location) and delivered (wirelessly or by wireline) to the device, such as to device 11, FIG. 1.

Process 602 then stores the delivered media on the device using memory and the internal processor (neither shown herein) of the device.

Process 603, for each instance of time, determines if all of the segments of the image, (for example, segments 22-1 and 22-2, FIG. 2) can be displayed. Determination of how many segments can be displayed is determined, in one embodiment, by the amount of "real-estate" available on the device at a point in time. For some devices, this will depend upon the horizontal or vertical orientation of the device, or it could depend upon the size of another application being displayed, or it could depend upon the known native available display size. Note that while only two segments have been shown, any number of segments can be downloaded, each containing "rules" for that particular segment's display. Process 603 then interprets the rules for each segment in accordance with information generated locally on the device. Also note that the height of a given segment can change to fit the available display space. In some instances, the segment may begin at one size (height or width) and then switch to a different height or width. In some situations, process 608 would interact with process 603 such that local rules could be used to modify the user experience. The local rules could be permanent or user changeable as desired.

If not all the segments can be displayed at a point in time, then process, 604 reduces the number of segments to the number that fit properly depending on available display size and/or on other content being concurrently displayed on the device.

Process 605 then determines when the currently not being displayed remaining segments should be displayed. Again, this could be based on device orientation, other media content or size, or on other factors, such as length of time one or more segments have already been displayed (or held off the device).

Process 606 controls the actual display of the segments including their orientation and position on the main display. In situations where process 603 determines that it is desirable to display all the segments then process 607 determines when to effect such a display, again based upon the criteria discussed with respect to process 605. Using the concepts and methods discussed above it is then possible to have media, such as advertisements, persist on the display for longer periods of time because they can be tailored to the available display size from time to time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for displaying media content on a display of a device, the method comprising:
   displaying, on the display of the device, first media content;
   receiving, by at least one processor, second media content, wherein the second media content is divided into segments, each of the segments of the second media content comprising one or more rules for displaying corresponding segments on the display of the device;
   storing, by the at least one processor, the second media content at a memory of the device;
   identifying, by the at least one processor, one or more conditions local to the device;
   determining, by the at least one processor, two or more segments of the segments of the second media content to display based on the one or more rules and the one or more conditions local to the device, wherein a first segment of the two or more segments comprises a different rule as compared to a second segment of the two or more segments;
   displaying, on the display of the device, the two or more segments of the segments of the second media content while displaying the first media content; and
   maintaining, at the memory of the device, non-displayed segments of the segments of the second media content such that the non-displayed segments are configured to be displayed on the display of the device upon a change in the one or more conditions local to the device.

2. The method of claim 1 wherein the second media content includes image content, video content, or a combination thereof.

3. The method of claim 1 wherein at least one segment of the segments of the second media content is interactive.

4. The method of claim 3 wherein at least one segment of the segments of the second media content is configured to expand at the display of the device in response to a user input.

5. The method of claim 3 wherein at least one segment of the segments of the second media content is configured to close in response to a user selecting the at least one segment of the segments of the second media content, causing gay remaining displayed segments of the second media content to re-scale.

6. The method of claim 1 wherein the two or more segments of the segments of the second media content remain on screen until one of the following: one of the two or more segments of the segments of the second media content is closed by a user, a pre-determined amount of time, and an orientation change of the display of the device.

7. The method of claim 1 wherein the one or more conditions local to the device are selected from a list consisting of: device orientation, native display space, size of other content being concurrently displayed, and bandwidth available to receive the second media content.

8. The method of claim 1 wherein the one or more rules determine which of the one or more conditions local to the device affect the segments of the second media content to display.

9. An apparatus configured for displaying media, the apparatus comprising:
   a display device;
   a memory; and
   at least one processor communicatively coupled to the display device and the memory, wherein the at least one processor is configured to:
   display first media content;
   receive second media content, wherein the second media content is divided into segments, each of the segments of the second media content comprising one or more rules for displaying corresponding segments on the display device;
   store the second media content at the memory;
   identify one or more conditions local to the at least one processor;
   determine two or more segments of the segments of the second media content to display on the display device, wherein the two or more segments of the segments of the second media content determined based on the one or more rules and the one or more conditions local to the at least one processor, wherein a first segment of the two or more segments comprises a different rule as compared to a second segment of the two or more segments;
   display the two or more segments of the segments of the second media content on the display device while the first media content is displayed; and
   maintain non-displayed segments of the segments of the second media content at the memory such that the non-displayed segments are configured to be displayed on the display device upon a change in the one or more conditions local to the display device.

10. The apparatus of claim 9 wherein at least one segment of the segments of the second media content is configured to expand at the display of the device in response to a user input.

11. The apparatus of claim 9 wherein at least one segment of the segments of the second media content is configured to close in response to a user selecting the at least one segment of the segments of the second media content, causing any remaining displayed segments of the second media content to re-scale.

12. The apparatus of claim 9 wherein the two or more segments of the segments of the second media content remain on screen until one of the following: one of the two or more segments of the segments of the second media content is closed by a user, a pre-determined amount of time, and an orientation change of the display of the device.

13. The apparatus of claim 9 wherein the one or more conditions local to the at least one processor are selected from a list consisting of: display device orientation, native display space, size of other content being concurrently displayed, and bandwidth available to receive the second media content.

14. The apparatus of claim 9 wherein the one or more rules determine which of the one or more conditions local to the at least one processor affect the segments of the second media content to display.

15. The apparatus of claim 9 wherein the second media content includes image content, video content, or a combination thereof.

16. The apparatus of claim 9 wherein at least one of the segments is interactive.

17. A non-transitory computer readable medium storing instructions that, when executed by at least one processor, cause the at least one processor to perform operations, the operations comprising:
displaying, on the display of a device, first media content;
receiving, by the at least one processor, second media content, wherein the second media content is divided into segments, each of the segments comprising one or more rules for displaying corresponding segments on the display of the device;
storing, by the at least one processor, the second media content at a memory of the device;
identifying, by the at least one processor, one or more conditions local to the device;
determining, by the at least one processor, two or more segments of the segments of the second media content to display based on the one or more rules and the one or more conditions local to the device, wherein a first segment of the two or more segments comprises a different rule as compared to a second segment of the two or more segments;
displaying, on the display of the device, the two or more segments of the segments of the second media content, while displaying the first media content; and
maintaining, at the memory of the device, non-displayed segments of the segments such that the non-displayed segments are configured to be displayed on the display of the device upon a change in the one or more conditions local to the device.

18. The computer readable medium of claim 17 wherein at least one segment of the segments of the second media content is configured to expand at the display of the device in response to a user input.

19. The computer readable medium of claim 17 wherein at least one segment of the segments of the second media content is configured to close in response to a user selecting the at least one segment of the segments of the second media content, causing any remaining displayed segments of the second media content to re-scale.

20. The computer readable medium of claim 17 wherein the two or more segments of the segments of the second media content remain on screen until one of the following: one of the two or more segments of the segments of the second media content is closed by a user, a pre-determined amount of time, and an orientation change of the display of the device.

21. The computer readable medium of claim 17 wherein the one or more conditions local to the device are selected from a list consisting of: device orientation, native display space, size of other content being concurrently displayed, and bandwidth available to receive the second media content.

22. The computer readable medium of claim 17 wherein the one or more rules determine which of the one or more conditions local to the device affect the segments of the second media content to display.

23. The computer readable medium of claim 17 wherein the second media content includes image content, video content, or a combination thereof.

24. The computer readable medium of claim 17 wherein at least one of the segments is interactive.

* * * * *

UNITED STATES PATENT AND TRADEMARK OFFICE
CERTIFICATE OF CORRECTION

PATENT NO. : 9,997,138 B2
APPLICATION NO. : 15/332953
DATED : June 12, 2018
INVENTOR(S) : SanGiovanni et al.

Page 1 of 1

It is certified that error appears in the above-identified patent and that said Letters Patent is hereby corrected as shown below:

In the Claims

At Column 6, Claim number 5, Line number 19, delete "causing gay remaining displayed segments" and replace with --causing any remaining displayed segments--.

Signed and Sealed this
Seventeenth Day of July, 2018

Andrei Iancu
*Director of the United States Patent and Trademark Office*